(12) United States Patent
Doi

(10) Patent No.: US 6,714,500 B2
(45) Date of Patent: Mar. 30, 2004

(54) OPTICAL DISC DRIVE AND SIGNAL PROCESSING METHOD

(75) Inventor: Akihiko Doi, Toyko (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/217,631

(22) Filed: Aug. 14, 2002

(65) Prior Publication Data

US 2003/0107966 A1 Jun. 12, 2003

(30) Foreign Application Priority Data

Dec. 6, 2001 (JP) .................................. 2001-372940

(51) Int. Cl.$^7$ ................................................. F11B 7/00
(52) U.S. Cl. ................. 369/53.26; 369/53.3; 369/53.32
(58) Field of Search .............................. 369/53.26, 53.3, 369/53.32, 47.36, 47.5, 47.51, 116, 47.49

(56) References Cited

U.S. PATENT DOCUMENTS 5,675,558 A * 10/1997 Katoh ........................ 369/32

* cited by examiner

*Primary Examiner*—Nabil Hindi
(74) *Attorney, Agent, or Firm*—Pillsbury Winthrop LLP

(57) ABSTRACT

An optical disc drive according to an embodiment of this invention includes a light-receiving section for receiving light, a conversion section for converting the light received by the light-receiving section into an electrical signal, a generation section for generating a slewing rate control signal, and a signal processing section for processing the electrical signal using the slewing rate control signal.

5 Claims, 3 Drawing Sheets

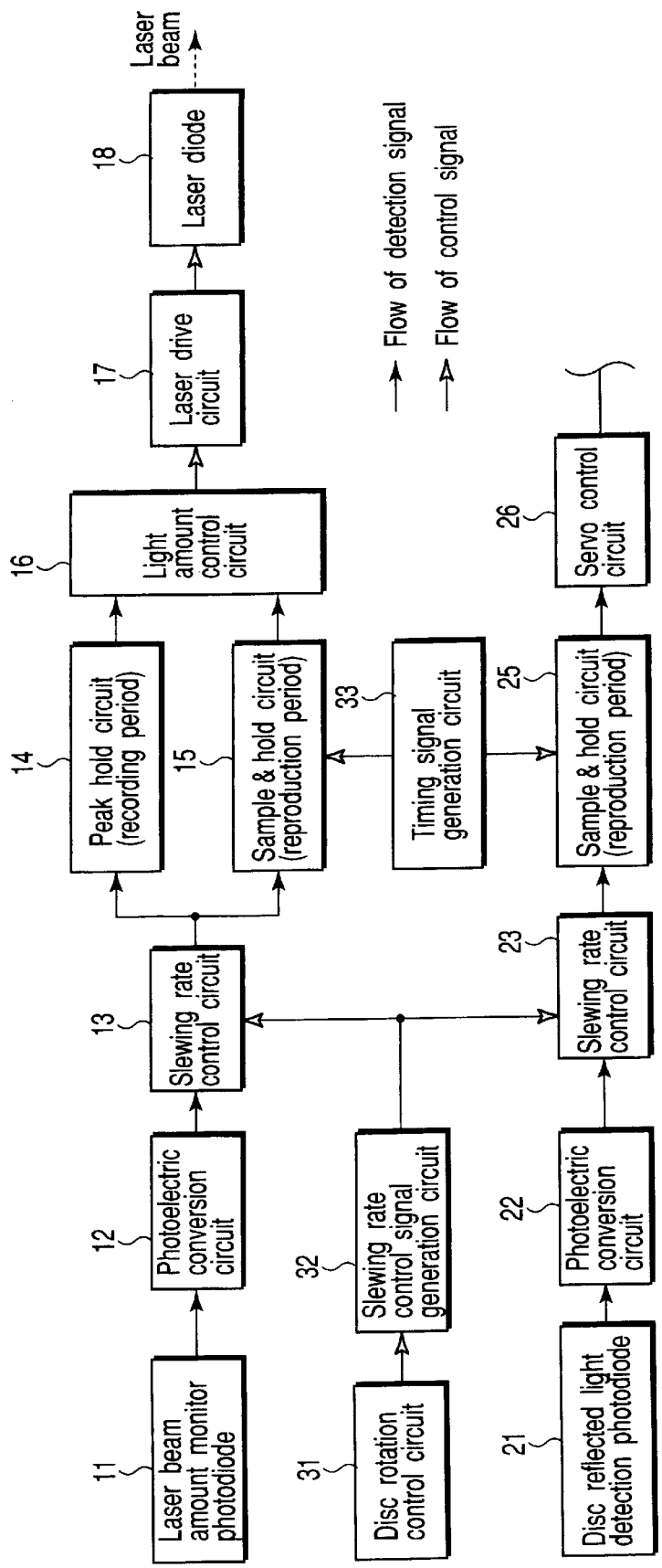
F I G. 1

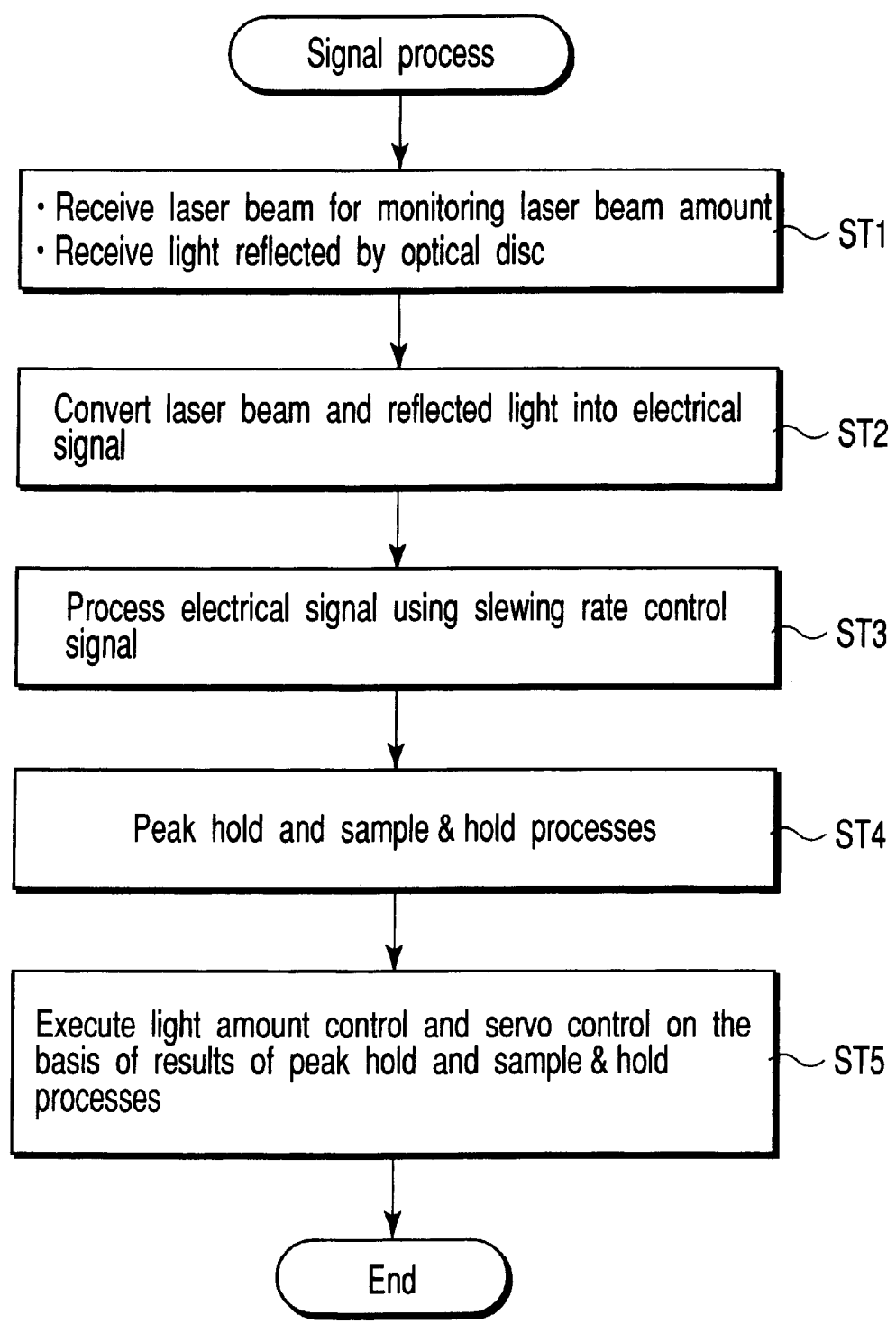
F I G. 3

OPTICAL DISC DRIVE AND SIGNAL PROCESSING METHOD

CROSS-REFERENCE TO RELATED APPLICATIONS

This application is based upon and claims the benefit of priority from the prior Japanese Patent Application No. 2001-372940, filed Dec. 6, 2001, the entire contents of which are incorporated herein by reference.

BACKGROUND OF THE INVENTION

1. Field of the Invention

The present invention relates to an optical disc drive for recording data on an optical disc and reproducing data recorded on the optical disc by irradiating it with a laser beam, and also to a signal processing method in the optical disc drive.

2. Description of the Related Art

In recent years, optical disc drives that record data on an optical disc and reproduce data recorded on the optical disc by irradiating the optical disc with a laser beam have been extensively studied and developed. In an optical disc drive, signals are detected using the sample & hold technique during a recording period (so-called mark period) in which data is recorded on the disc, and a reproduction period (so-called space period) between neighboring recording pulses. More specifically, a monitor signal indicating the amount of light emitted by a laser is detected to control the amount of a laser beam, and an error signal obtained from light reflected by the optical disc during the reproduction period is detected to control focusing and tracking.

However, signal detection precision suffers problems as the speed of the optical disc drive increases. Upon detecting a monitor signal that indicates the amount of light emitted by the laser, the mark and space levels are detected respectively. Upon detecting an error signal, the space level alone is detected. With increasing speed of the optical disc drive, the monitor and error signals cannot be detected in time, thus causing detection errors. Consequently, the laser light amount control or servo control precision impairs.

BRIEF SUMMARY OF THE INVENTION

It is an object of the present invention to provide an optical disc drive and signal processing method that can assure high signal detection precision.

(1) An optical disc drive according to an aspect of the present invention comprises an emitting section configured to emit a disc with a laser beam, a light-receiving section configured to receive the laser beam emitted by the emitting section, a converting section configured to convert the laser beam received by the light-receiving section into an electrical signal, a slewing rate control section set after the converting section and configured to generate a slewing rate control signal in accordance with a rotational velocity of the disc, and reducing a change in amplitude of the electrical signal on the basis of the slewing rate control signal, and a signal processing section configured to process the electrical signal controlled by the slewing rate control section.

(2) A signal processing method according to an aspect of the present invention comprises the steps of receiving light, converting the received light into an electrical signal, and processing the electrical signal using a slewing rate control signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram showing the arrangement of a signal processing unit of an optical disc drive according to an embodiment of the present invention;

FIG. 3 is a flow chart for explaining the signal process in the optical disc drive.

DETAILED DESCRIPTION OF THE INVENTION

Figure 2:
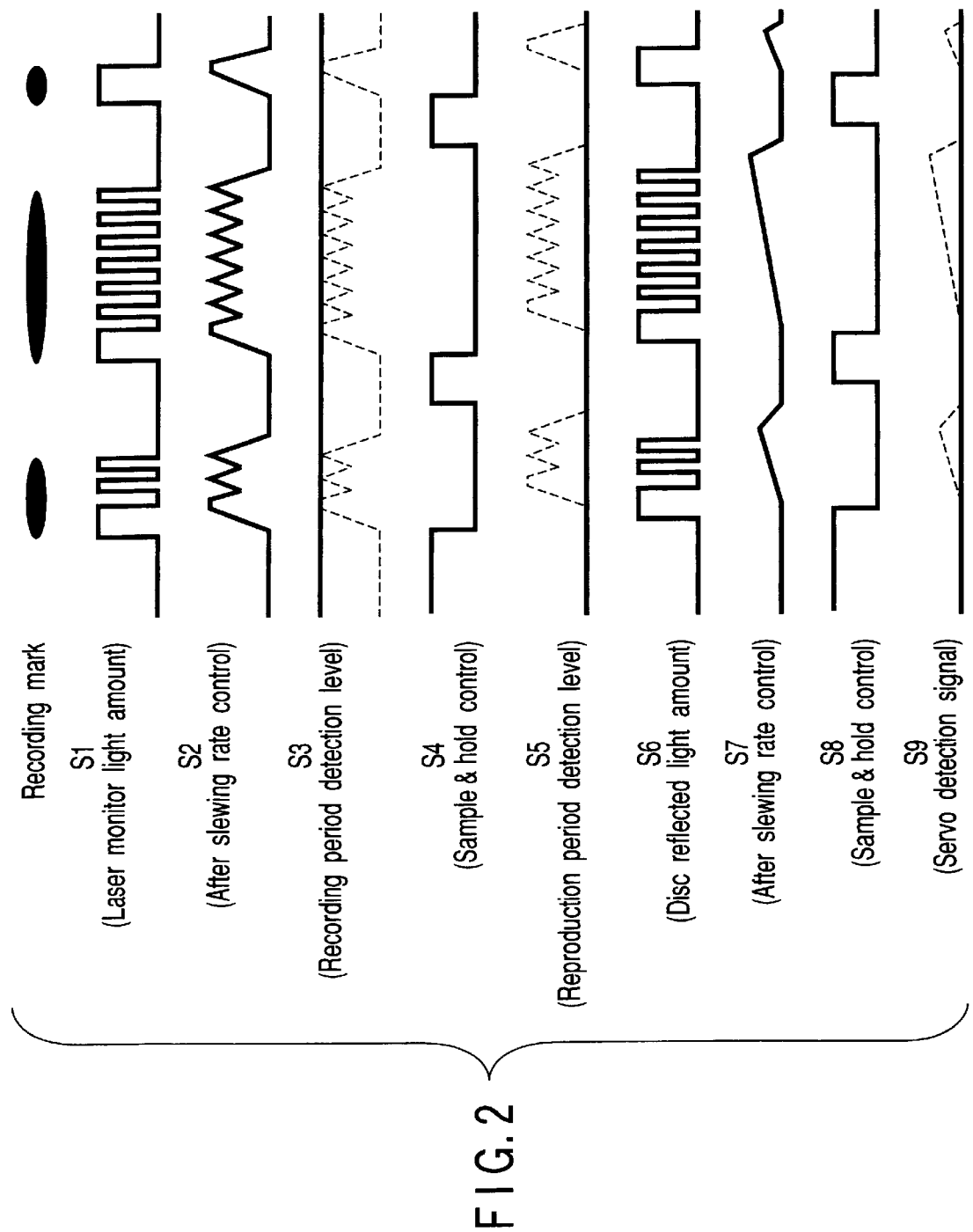
FIG. 2 is a chart for explaining the signal waveforms to be processed in the optical disc drive.

A preferred embodiment of the present invention will be described hereinafter with reference to the accompanying drawings.

FIG. 1 is a schematic block diagram showing the arrangement of a signal processing unit of an optical disc drive according to an embodiment of the present invention. This optical disc drive irradiates an optical disc with a laser beam to record data on the optical disc or to reproduce data recorded on the optical disc. Note that the optical disc indicates a CD, DVD, MO, or the like, and the type of disc is not particularly limited.

As shown in FIG. 1, the optical disc drive comprises a laser beam amount monitor photodiode 11, photoelectric conversion circuit 12, slewing rate control circuit 13, peak hold circuit 14, sample & hold circuit 15, light amount control circuit 16, laser drive circuit 17, laser diode 18, reflected light detection photodiode 21, photoelectric conversion circuit 22, slewing rate control circuit 23, sample & hold circuit 25, servo control circuit 26, disc rotation control circuit 31, slewing rate control signal generation circuit 32, and timing signal generation circuit 33.

The laser drive circuit 17 drives the laser diode 18 to make it emit a laser beam. The laser beam emitted by the laser diode 18 is split by a beam splitter (not shown) into a laser beam with which the optical disc is irradiated via an objective lens (not shown), and a laser beam that enters the laser beam amount monitor photodiode 11.

The signal flow corresponding to the laser beam that enters the laser beam amount monitor photodiode 11 will be explained first. The laser beam that has entered the laser beam amount monitor photodiode 11 is converted into an electrical signal by the photoelectric conversion circuit 12. The slewing rate control circuit 13 processes the electrical signal converted by the photoelectric conversion circuit 12 using a slewing rate control signal. With this process, noise at the head of a leading pulse of the electrical signal is removed. This slewing rate control signal is generated by the slewing rate control signal generation circuit 32. The slewing rate control signal generation circuit 32 receives a disc rotation state reported from the disc rotation control circuit 31, and generates the slewing rate control signal on the basis of this disc rotation control state. If the disc rotational velocity is high, a slewing rate control period is shortened; otherwise, that period is prolonged. That is, the slewing rate control signal is generated in accordance with the disc rotational velocity. During the aforementioned recording period, the peak hold circuit 14 holds the peak of the electrical signal processed using the slewing rate control signal. The light amount control circuit 16 controls the laser drive circuit 17 on the basis of the peak hold result, thus controlling the amount of the laser beam emitted by the laser diode 18. During the aforementioned reproduction period, the sample & hold circuit 15 samples and holds the electrical signal processed using the slewing rate control signal on the basis of a timing signal generated by the timing signal generation circuit 33. This timing signal is used to sample the electrical signal converted by the photoelectric conversion circuit 22 from its trailing edge to a level after an elapse of a predetermined period of time on the basis of the leading edge of that electrical signal. The light amount control circuit 16 controls the laser drive circuit 17 on the basis of the sample & hold result to control the amount of the laser beam emitted by the laser diode 18.

Subsequently, the signal flow corresponding to light by the optical disc upon irradiating the optical disc with the laser beam will be explained below. Light reflected by the optical disc enters the disc reflected light detection photodiode 21. The laser beam that has entered the disc reflected light detection photodiode 21 is converted into an electrical signal by the photoelectric conversion circuit 22. The slewing rate control circuit 23 processes the electrical signal converted by the photoelectric conversion circuit 22 using a slewing rate control signal. This slewing rate control signal is generated by the slewing rate control signal generation circuit 32. The slewing rate control signal generation circuit 32 is as has been described above. During the aforementioned reproduction period, the sample & hold circuit 25 samples and holds the electrical signal processed using the slewing rate control signal. The servo control circuit 26 outputs a servo control signal to respective units on the basis of the sample & hold result.

The signal waveforms to be processed in the optical disc drive will be explained below with reference to FIG. 2. Assume that recording marks shown in the uppermost chart in FIG. 2 are to be processed. At this time, a signal S1 to be monitored by the laser beam amount monitor photodiode 11, i.e., a signal S1 output from the photoelectric conversion circuit 12, is as shown in FIG. 2. A signal S2 obtained by processing this signal S1 using the slewing rate control signal, i.e., a signal S2 output from the slewing rate control circuit 13 is as shown in FIG. 2. A signal S3 obtained as a result of holding the peak of the signal S2, i.e., a signal S3 output from the peak hold circuit 14, is as shown in FIG. 2. A timing signal for sample & hold control, i.e., a signal S4 output from the timing signal generation circuit 33 is as shown in FIG. 2. The signal S4 falls in response to the first leading edge of the signal S1 during the mark period, and rises after an elapse of a predetermined period of time from the last trailing edge of the mark period. A signal S5 obtained as a result of sampling and holding the signal S2 at the timing of the signal S4, i.e., a signal S5 output from the sample & hold circuit 15, is as shown in FIG. 2. A signal S6 detected by the disc reflected light detection photodiode 21, i.e., a signal S6 output from the photoelectric conversion circuit 22, is as shown in FIG. 2. A signal S7 obtained by processing this signal S6 using the slewing rate control signal, i.e., a signal S7 output from the slewing rate control circuit 23, is as shown in FIG. 2. A timing signal for sample & hold control, i.e., a signal S8 output from the timing signal generation circuit 33, is as shown in FIG. 2. The signal S8 falls in response to the first leading edge of the signal S6, and rises after an elapse of a predetermined period of time from the last trailing edge. A signal S9 as a result of sampling and holding the signal S7 at the timing of the signal S8, i.e., a signal S9 output from the sample & hold circuit 25, is as shown in FIG. 2.

Referring to FIG. 2, the signal S1 has different waveform patterns in correspondence with the leading and trailing ends of respective recording marks. With the slewing rate control, the waveform patterns corresponding to the leading and trailing ends of a recording mark are made to be equivalent to each other (to reduce a change of amplitude). That is, the slewing rate control removes noise generated at the head of the leading pulse of the signal S1 (to convert the signal S1 into the signal S2). When the peak of this signal S2 is held to detect the recording level, or this signal S2 is sampled and held to detect the reproduction level, a normal detection level can be obtained.

A servo control signal can be obtained if the reproduction level can be detected by sampling and holding. Hence, the slewing rate control sufficiently delays the leading edge corresponding to the leading end of a recording mark, and advances the trailing edge corresponding to the trailing end of the recording mark. That is, the slewing rate control converts the signal S6 into the signal S7. With this conversion, a change in amplitude is reduced, and the reproduction level can be recovered earlier. In this way, high detection precision can be obtained.

As described above, the slewing rate control signal is generated in accordance with the disc rotational velocity. That is, by changing the slewing rate control signal in correspondence with the recording velocity, stable signal detection can be implemented irrespective of the recording velocity.

FIG. 3 is a flow chart for explaining the signal process in the optical disc drive. Light is received (ST1). That is, the laser beam enters the laser light amount monitor photodiode 11. Also, reflected light enters the disc reflected light detection photodiode 21. The received light is converted into an electrical signal (ST2). That is, the laser beam that has entered the laser light amount monitor photodiode 11 is converted into an electrical signal by the photoelectric conversion circuit 12. Also, the reflected light that has entered the disc reflected light detection photodiode 21 is converted into an electrical signal by the photoelectric conversion circuit 22. The converted electrical signal is processed using the slewing rate control signal (ST3). That is, the electrical signal converted by the photoelectric conversion circuit 12 is processed by the slewing rate control circuit 13 using the slewing rate control signal. Also, the electrical signal converted by the photoelectric conversion circuit 22 is processed by the slewing rate control circuit 23 using the slewing rate control signal. The electrical signal processed using the slewing rate control signal undergoes a peak hold or sample & hold process (ST4), and the light amount control or servo control is made on the basis of the peak hold result or the sample & hold result (ST5). A change in amplitude of the electrical signal processed using the slewing rate control signal is reduced. In this way, the peak hold or sample & hold process can normally detect a signal, and correct light amount control and servo control are consequently implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disc drive comprising:

an emitting section configured to emit a disc with a laser beam;

a light-receiving section configured to receive the laser beam emitted by said emitting section;

a converting section configured to convert the laser beam received by said light-receiving section into an electrical signal;

a slewing rate control section set after said converting section and configured to generate a slewing rate control signal in accordance with a rotational velocity of the disc, and to reduce a change in amplitude of the electrical signal on the basis of the slewing rate control signal; and a signal processing section configured to process the electrical signal controlled by said slewing rate control section.

2. A drive according to claim 1, wherein said light-receiving section directly receives the laser beam emitted by said emitting section, and said drive further comprises:

a peak hold section configured to hold a peak of the electrical signal processed using the slewing rate control signal; and a light amount control section configured to control an amount of the laser beam emitted by said emitting section upon recording on the basis of a peak hold result of said peak hold section.

3. A drive according to claim 1, wherein said light-receiving section directly receives the laser beam emitted by said emitting section, and said drive further comprises:

a sample & hold section configured to sample and hold the electrical signal processed using the slewing rate control signal; and a light amount control section configured to control an amount of the laser beam emitted by said emitting section upon reproduction on the basis of a sample & hold result of said sample & hold section.

4. A drive according to claim 1, wherein said light-receiving section receives light emitted by said emitting section and reflected by the optical disc, and said drive further comprises:

a sample & hold section configured to sample and hold the electrical signal processed using the slewing rate control signal; and a servo control section configured to control servo upon reproduction on the basis of a sample & hold result of said sample & hold section.

5. A signal processing method comprising the steps of:

receiving light;

converting the received light into an electrical signal;

processing the electrical signal using a slewing rate control signal;

generating a slewing rate control signal in accordance with a rotational velocity of a disc; and reducing a change in amplitude of the electrical signal on the basis of the slewing rate control signal.

* * * * *